United States Patent
Yutzy (10) Patent No.: US 12,220,833 B2
(45) Date of Patent: Feb. 11, 2025

(54) HANDLING AND VARIABLE LENGTH PROCESSING OF MATERIALS

(71) Applicant: Allen F. Yutzy, Westmoreland, TN (US)

(72) Inventor: Allen F. Yutzy, Westmoreland, TN (US)

( * ) Notice: Subject to any disclaimer, the term of this patent is extended or adjusted under 35 U.S.C. 154(b) by 301 days.

(21) Appl. No.: 17/568,822

(22) Filed: Jan. 5, 2022

(65) Prior Publication Data

US 2022/0212360 A1     Jul. 7, 2022

Related U.S. Application Data

(60) Provisional application No. 63/133,904, filed on Jan. 5, 2021.

(51) Int. Cl.
*B27B 17/00*     (2006.01)
*A01G 23/083*    (2006.01)
*A01G 23/091*    (2006.01)
*B27B 1/00*      (2006.01)
*B27L 7/00*      (2006.01)
*B66F 9/18*      (2006.01)

(52) U.S. Cl.
CPC ........ *B27B 17/0091* (2013.01); *A01G 23/083* (2013.01); *A01G 23/091* (2013.01); *B27B 1/002* (2013.01); *B27L 7/00* (2013.01); *B66F 9/18* (2013.01)

(58) Field of Classification Search
CPC ..... B27B 17/0091; B27B 1/002; B27B 25/02; B27B 29/00; B27B 31/003; A01G 23/083; A01G 23/091; B27L 7/00; B66F 9/18; B66C 3/04
See application file for complete search history.

(56) References Cited

U.S. PATENT DOCUMENTS

| | | | |
|---|---|---|---|
| 3,254,686 A | | 6/1966 | Boyd et al. |
| 3,688,818 A | * | 9/1972 | Domres ................. B27B 29/00 83/167 |
| 3,709,269 A | * | 1/1973 | Cervenak ............... B27L 1/045 83/869 |
| 3,797,541 A | * | 3/1974 | Kurelek ............... A01G 23/083 144/343 |
| 4,974,648 A | * | 12/1990 | Propst .................. A01G 23/095 144/248.6 |

(Continued)

FOREIGN PATENT DOCUMENTS

WO    WO-2006126952 A2 * 11/2006 ........... A01G 23/083

*Primary Examiner* — Evan H Macfarlane
(74) *Attorney, Agent, or Firm* — Jacob M. Ward; Ward Law Office LLC (57) ABSTRACT

An attachment for handling and variable length processing of a material having a longitudinal axis includes a material engagement assembly and a processing assembly. The material engagement assembly is configured to engage the material about the longitudinal axis and includes a planar engagement surface and a curved engagement surface configured to move relative to the planar engagement surface and engage the material therebetween. The processing assembly is variably positionable along a portion of the longitudinal axis of the material when the material is engaged by the material engagement assembly. The attachment can include a roller system configured to drive the material along the linear travel path without length restrictions.

5 Claims, 11 Drawing Sheets

(56) References Cited

U.S. PATENT DOCUMENTS

| | | | | |
|---|---|---|---|---|
| 4,981,163 | A * | 1/1991 | Westlund | A01G 23/083 144/24.13 |
| 5,082,036 | A * | 1/1992 | Vierikko | A01G 23/083 144/34.1 |
| 5,163,489 | A * | 11/1992 | Ketonen | A01G 23/097 144/34.1 |
| 5,441,090 | A * | 8/1995 | Hill | A01G 23/003 144/34.1 |
| 5,676,238 | A * | 10/1997 | Saastamo | B27B 25/02 198/836.2 |
| 5,732,754 | A * | 3/1998 | Moisio | A01G 23/08 144/24.13 |
| 5,957,177 | A * | 9/1999 | Smith | A01G 23/083 144/248.7 |
| 6,318,425 | B1 * | 11/2001 | Niemi | A01G 23/095 144/357 |
| 6,622,761 | B1 * | 9/2003 | Paakkunainen | A01G 23/095 144/24.13 |
| 9,155,253 | B2 * | 10/2015 | Arvidsson | G01B 5/10 |
| 10,414,633 | B1 * | 9/2019 | Westendorf | E02F 3/4135 |
| 10,464,149 | B2 * | 11/2019 | Maki-Haapoja | G01B 11/043 |
| 10,561,071 | B2 * | 2/2020 | Hawkins | B64U 30/293 |
| 11,051,465 | B2 * | 7/2021 | Matsumoto | A01G 23/095 |
| 2017/0071141 | A1 * | 3/2017 | Koponen | A01G 23/083 |

* cited by examiner

HANDLING AND VARIABLE LENGTH PROCESSING OF MATERIALS

CROSS-REFERENCE TO RELATED APPLICATIONS

This application claims priority to and the benefit of U.S. Provisional Application No. 63/133,904, filed on Jan. 5, 2021. The entire disclosure of the above application is incorporated herein by reference.

FIELD

The present disclosure relates to an attachment for processing of a material, and more particularly, to an attachment for a powered vehicle that can manipulate and cut wooden materials.

BACKGROUND

The statements in this section merely provide background information related to the present disclosure and may not constitute prior art.

The forestry and lumber industries are continually seeking to improve efficiency in processing wood. Various types of powered equipment and attachments can be employed. For example, various types of timber harvesting attachments can be coupled to a forestry work machine to perform a number of functions in connection with timber harvesting. Various assortments of attachments can be used in various processes, including attachments adapted to certain uses including felling a standing tree, grappling a felled tree, processing a felled tree by delimbing and/or debarking, and/or crosscutting the trunk or stem of the tree. Certain attachments are configured to operate on a single tree whereas other attachments are configured to operate on multiple felled trees. In harvesting and preparation of wood materials, it can be desirable to measure a diameter and/or a length of the material and determine an optimal position of saw cuts in order to maximize utility and value of the material. Likewise, partially processed logs as well as rough or even finished timber can require skidding or transport as well as further processing, including crosscutting, to produce wood materials having desired dimensions.

Accordingly, there is a need for an attachment for a powered vehicle, such as a skid-steer, where the attachment can manipulate wood materials ranging from a log, rough timber, and even finished timber, allowing transport and/or loading of such materials, as well as further crosscutting to particular demands.

SUMMARY

In concordance with the instant disclosure, an attachment for handling and variable length processing of a material having a longitudinal axis that does not restrict engagement of the material due to a length of the material, which allows engagement of the material at various points along the longitudinal axis without structurally interfering with the length, and that does not require disengagement of the material to move the material along a linear travel path, is surprisingly discovered.

In one embodiment, an attachment for handling and variable length processing of a material having a longitudinal axis includes a material engagement assembly and a processing assembly. The material engagement assembly can be configured to engage the material about the longitudinal axis and can include a planar engagement surface and a curved engagement surface. The curved engagement surface can be configured to move relative to the planar engagement surface and engage the material therebetween. The processing assembly can be variably positionable along a portion of the longitudinal axis of the material when the material is engaged by the material engagement assembly.

In one example, no portion of the attachment is operable to restrict a length of the material along the longitudinal axis thereof when engaged by the material engagement assembly.

In other various examples, the material engagement assembly can include a grab having the planar engagement surface and the curved engagement surface, and/or the planar engagement surface can include a first planar portion and a second planar portion at a right angle relative to the first planar portion. The material engagement assembly can include a pair of planar tines having the planar engagement surface, wherein a crossmember can extend between the pair of curved tines. The processing assembly can include a saw configured to cut the material orthogonal to the longitudinal axis thereof when the material is engaged by the material engagement assembly.

In another example, the attachment can include a guide system configured to ascertain a processing location when the material is engaged by the material engagement assembly.

In another embodiment, an attachment for handling and variable length processing of a material having a longitudinal includes a frame having a front side, a material engagement assembly, a processing assembly, and an actuator. The material engagement assembly can include a planar engagement surface can be coupled to the front side of the frame and a top clamp defining a curved engagement surface, the top clamp can be pivotally coupled to the frame and pivot between an open position and a closed position relative to the planar engagement surface. The processing assembly can be slidably disposed relative to the material engagement assembly. The actuator can include a first end coupled to the frame and a second end coupled to the top clamp of the material engagement assembly. The actuator can be configured to pivotally move the top clamp between the open position and the closed position, wherein when the top clamp is in the closed position, the planar engagement surface and the curved engagement surface engages the material about the longitudinal axis therebetween without restricting a length of the material.

In one example, the top clamp can include a pair of curved tines having the curved engagement surface. A distance between the curved tines can decrease toward a distal end of the top clamp.

In other various examples, the processing assembly can include a saw configured to cut the material orthogonal to the longitudinal axis thereof when the material is engaged by the material engagement assembly. The attachment can further include a guide system configured to ascertain a processing location when the material is engaged by the material engagement assembly.

In another embodiment, an attachment for handling and variable length processing of a material having a longitudinal includes a frame having a front side, a material engagement assembly, an actuator, a roller system, and a processing assembly.

The material engagement assembly can include a top clamp pivotally coupled to the frame and pivot between an open position and a closed position.

The actuator can include a first end coupled to the frame and a second end coupled to the top clamp of the material engagement assembly. The actuator can be configured to pivotally move the top clamp between the open position and the closed position. The roller system can be rotationally coupled to the front side of the frame and the top clamp of the material engagement assembly. The processing assembly can be slidably disposed relative to the material engagement assembly.

When the top clamp is in the closed position, the material engagement assembly can engage the material about the longitudinal axis and the roller system can bear against and surround the material such that the roller system forms a linear travel path. The roller system can be configured to drive the material along the linear travel path without restricting a length of the material.

In one example, the roller system can drive the material along the linear travel path in at least one of a first direction toward the processing assembly and a second direction away from the processing assembly.

In another example, the roller system can include a plurality of roller devices, each roller device can have a shaft and a row of guide rollers mounted on the shaft. The row of guide rollers of each of the plurality of roller devices can include outer guide rollers and inner guide rollers. The outer guide rollers can define a diameter that is larger than a diameter of the inner guide rollers such that the row of guide rollers forms a concave shape corresponding to an outer surface of the material.

In other various examples, the processing assembly can include a saw configured to cut the material orthogonal to the longitudinal axis thereof when the material is engaged by the material engagement assembly. The attachment can further include a guide system configured to ascertain a processing location when the material is engaged by the material engagement assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology is drawn to improved attachments for a powered vehicle, such as a skid-steer, where the attachment can manipulate wood materials ranging from a log, rough timber, and even finished timber, allowing transport and/or loading of such materials, as well as further crosscutting to particular demands. Uses of such attachments are also provided. For example, the attachment can be coupled to wheeled and/or tracked vehicles or carriers, especially articulating loaders, skid steer loaders, etc., capable of handling lumber, logs, poles, pallets, and any material suitable for pallet/lumber or log forks by using a material engagement assembly that can include a top clamp or grapple to engage and secure the material. The attachment is accordingly capable of crosscutting or saw bucking tree length stems after being limbed and topped and can also be employed in crosscutting lumber, cants, railroad ties, flitches, and/or any wood materials or products in need of crosscutting at variable positions. Operation of such attachments can include crosscutting or saw bucking with a hydraulic powered chain and saw bar, measuring and marking tree length timber into log lengths by engaging and clamping on forks/tines with top clamp, and side shift adjusting the position of the processing saw on a desired mark with a guiding system such as a camera, then cutting the material into one or more desired lengths.

Figure 1:
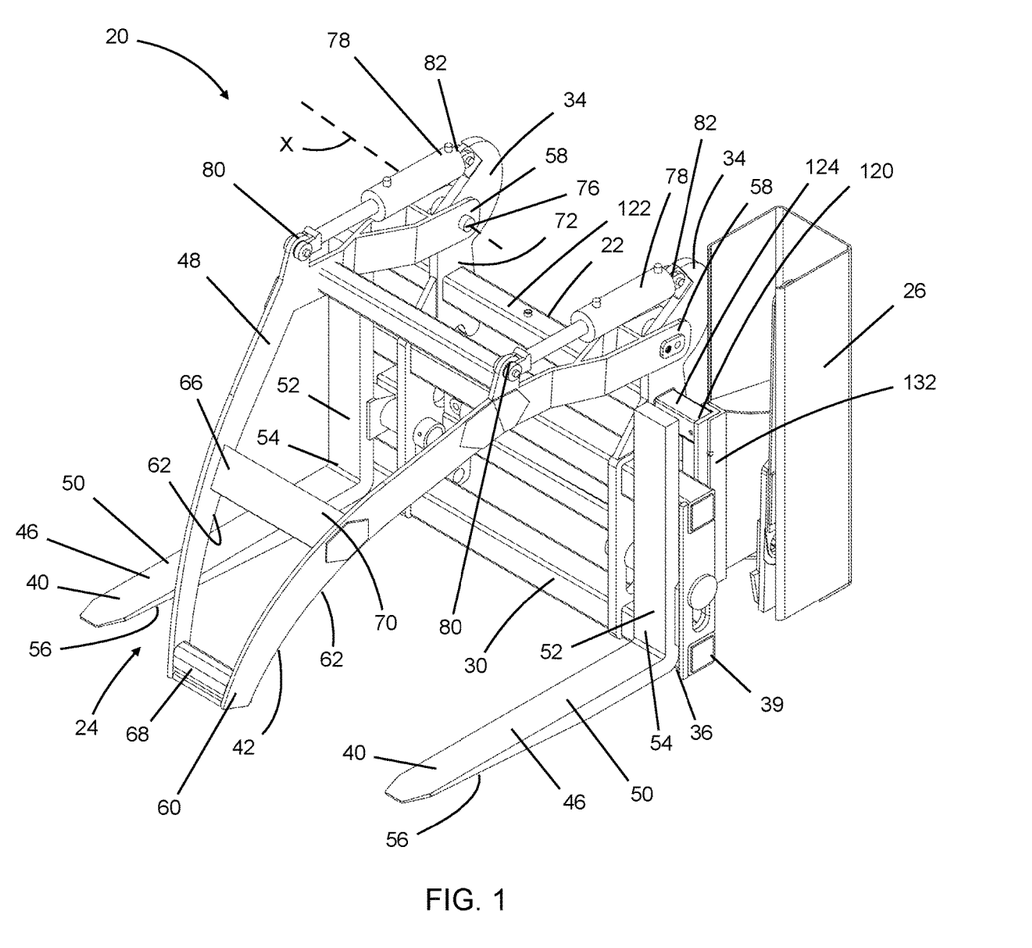
FIG. 1 is a perspective view of an attachment for handling and variable length processing of a wooden material according to one embodiment of the present disclosure.
Figure 2:
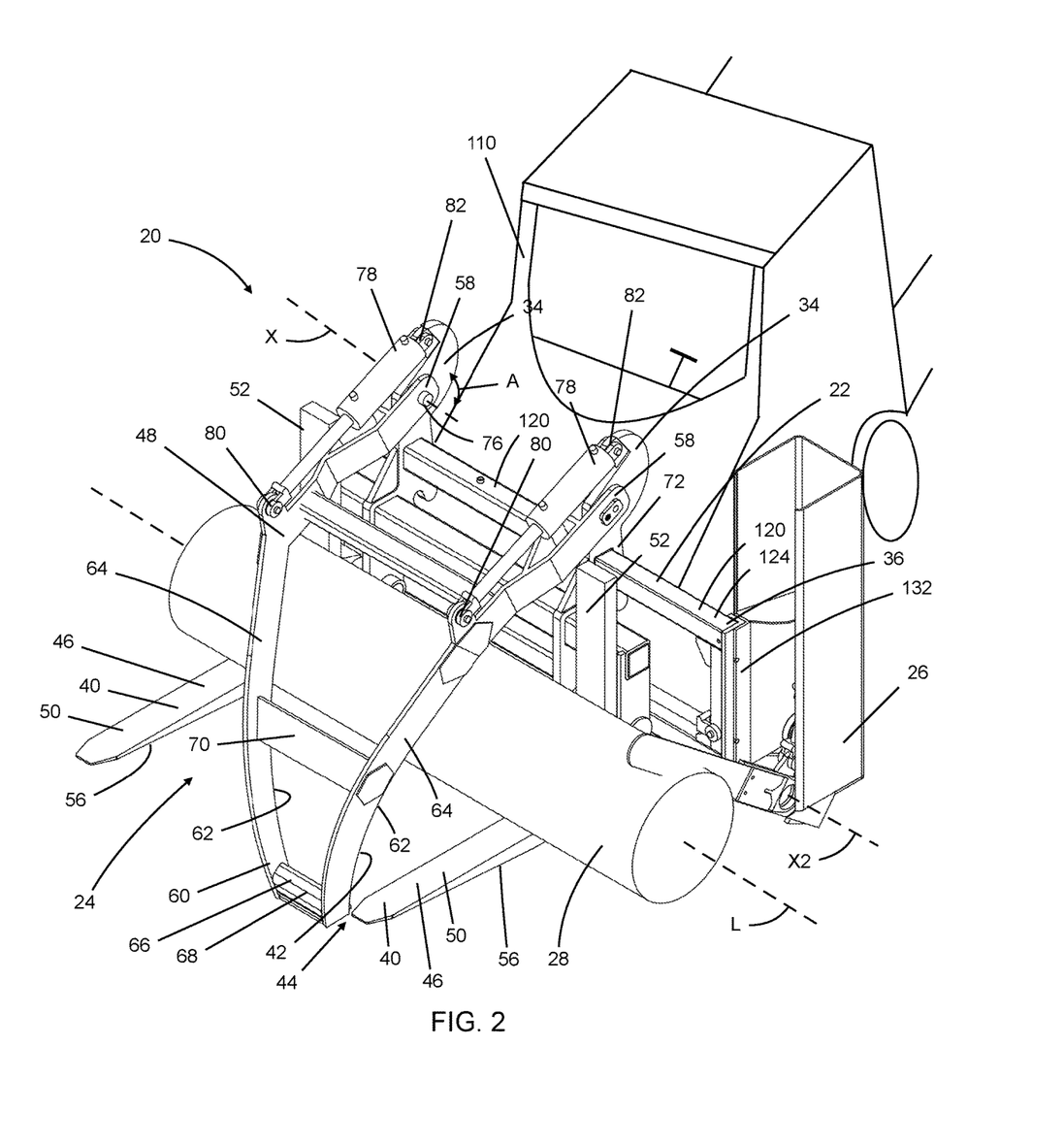
FIG. 2 is a perspective view of the attachment of FIG. 1, depicting the attachment engaging a log.
Figure 3:
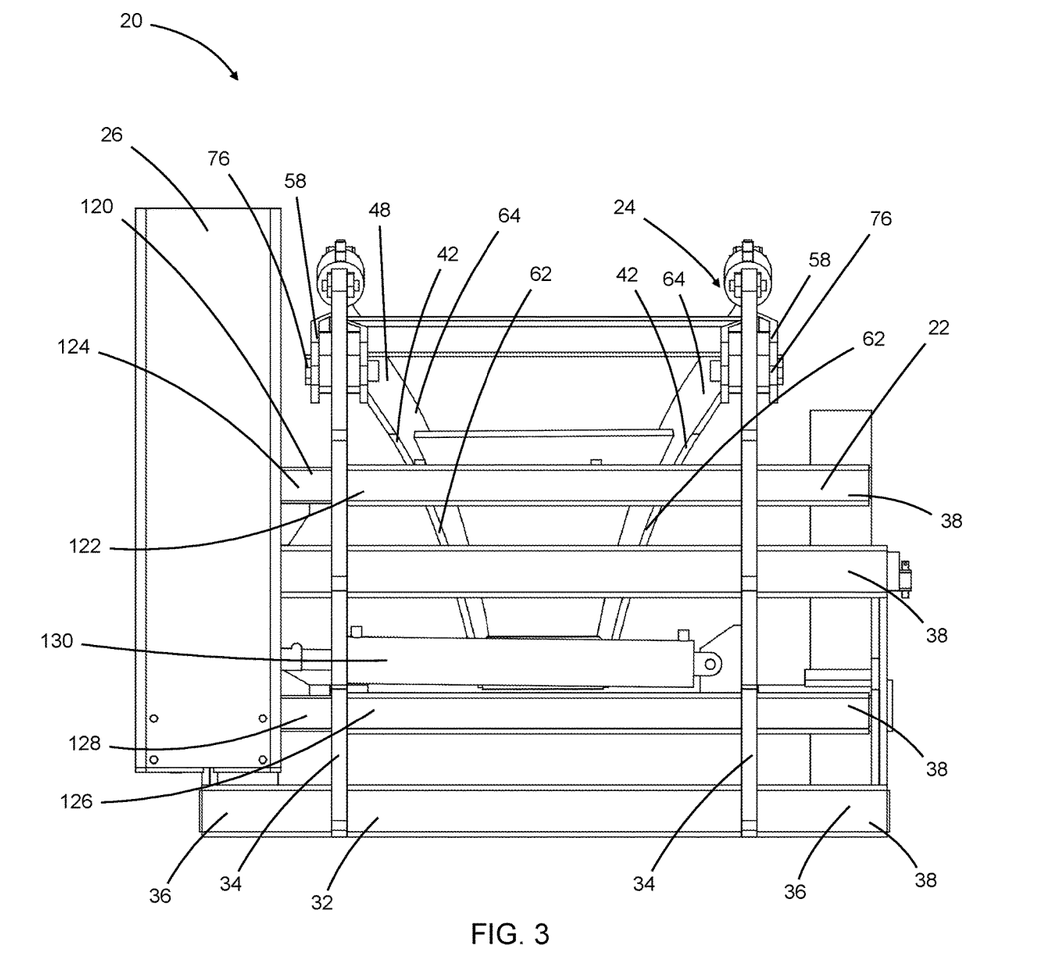
FIG. 3 is a rear elevational view of the attachment of FIG. 1.

Referring to FIGS. 1-3, an attachment 20 for handling and variable length processing of a material 28 having a longitudinal axis L is shown. The attachment 20 includes a frame 22, a material engagement assembly 24 coupled to the frame 22, and a processing assembly 26 coupled to one end of the frame 22. The material engagement assembly 24 is configured for engaging the material 28 about the longitudinal axis L thereof and the processing assembly 26 is configured to be variably positionable along a portion of the longitudinal axis L of the material 28 when the material 28 is engaged by the material engagement assembly 24.

The attachment 20 can be coupled to a powered vehicle (FIG. 2) and used to handle various wood materials 28 ranging from a log, rough timber, and even finished timber, where such wood materials 28 can be transported and/or loaded, as well as where such wood materials 28 can be crosscut at one or more selected variable points.

Aspects of the attachment 20 provided herein include where no portion of the attachment 20 is operable to restrict a length of the material 28 along the longitudinal axis L thereof when engaged by the material engagement assembly 24. For example, the material engagement assembly 24 can engage the material 28 at various points along the longitudinal axis L thereof without any structure of the attachment 20 interfering with any length of the material 28. Configuration of the material engagement assembly 24 can therefore be absent of any obstruction or portion that would conflict with an extension of the longitudinal axis L of the material 28, at any point along the material 28 or at any point along the longitudinal axis L extending beyond the material 28. In this way, the attachment 20 has no restriction on the position and/or length of material 28 engageable by the material engagement assembly 24. Certain types of attachments, other than those provided herein, can have an end plate or butt plate for stacking one or more wooden materials against, thereby providing a defined end point of the length and longitudinal axis L of the material 28. Stacking multiple wooden materials against such a plate can allow a common end point for the multiple materials 28, where combined crosscutting results in processed materials all having a common length. The attachment 20 of the present disclosure, however, has no restriction on the length of the material 28 relative to the material engagement assembly 24 so that a log, rough timber, or finished timber (e.g., lumber, board, plank, etc.) can be processed at almost any point along a length thereof.

With continued reference to FIGS. 1-3, the frame 22 includes a front side 30, a back side 32, and vertical support members 34 disposed at opposing ends 36 and configured to support the material engagement assembly 24. The frame 22 is shown as a generally rectangular structure.

As best shown in FIG. 3, in one example, the frame 22 can include a plurality of tubular support beams 38 extending longitudinally and across the vertical support members 34, wherein each tubular support beam 38 has a generally square cross-section 39 (FIG. 1). It should be appreciated that a skilled artisan can scale the shape, size and number of support beans, as desired. In a non-limiting example, the frame 22 can include cylindrical support beams having a circular cross-section.

The frame 22 can include a track system 120 coupled to the processing assembly 26 for adjusting the position of the processing assembly 26 about the longitudinal axis L of the material 28 when the material 28 is engaged by the material engagement assembly 24. As best shown in FIG. 3, the track system 120 includes an upper outer beam 122, an upper inner beam 124, a lower outer beam 126, and a lower inner beam 128. The upper inner beam 124 is configured to be detachably coupled to and slidingly engaged with the upper outer beam 122 to permit the upper inner beam 124 to extend or telescope from the upper outer beam 122. Likewise, the lower inner beam 128 is configured to be detachably coupled to and slidingly engaged with the lower outer beam 126 to permit the lower inner beam 128 to extend or telescope from the lower outer beam 126. The processing assembly 26 can be coupled to the track system 120 via an attachment assembly 132 (FIG. 1). In this way, the telescoping track system 120 provides the attachment 20 with a variable length to allow the processing assembly 26 to be variably positionable along the portion of the longitudinal axis L of the material 28 when the material 28 is engaged by the material engagement assembly 24.

The track system 120 can be powered in various ways to control the telescoping movement of the upper inner beam 124 and lower inner beam 128. In one example, the attachment 20 includes hydraulically powering the track system 120. A hydraulic cylinder 130 is provide that is adapted to control the telescoping movement of the upper inner beam 124 and lower inner beam 128, thereby controlling the position of the processing assembly 26.

Figure 4:
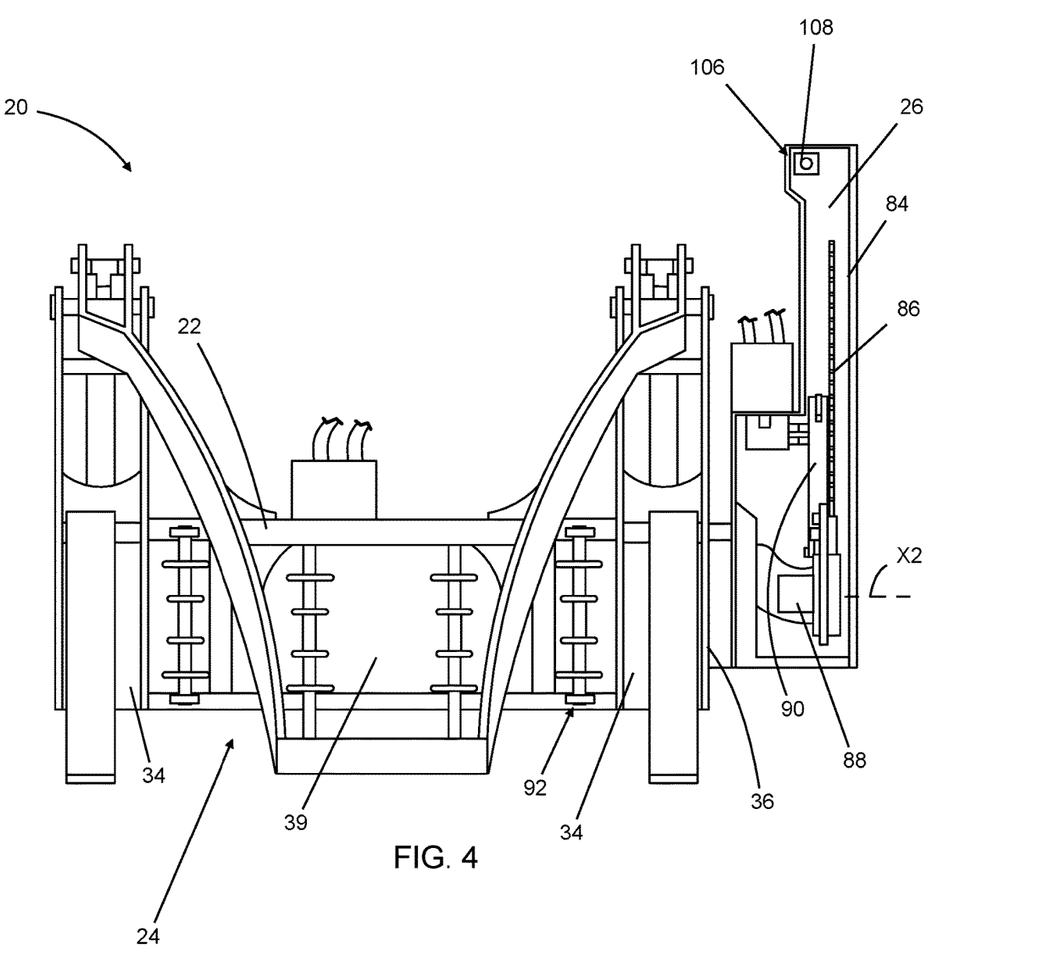
FIG. 4 is a front elevational view of an attachment according to the present disclosure, depicting a frame having a solid structure.
Figure 5:
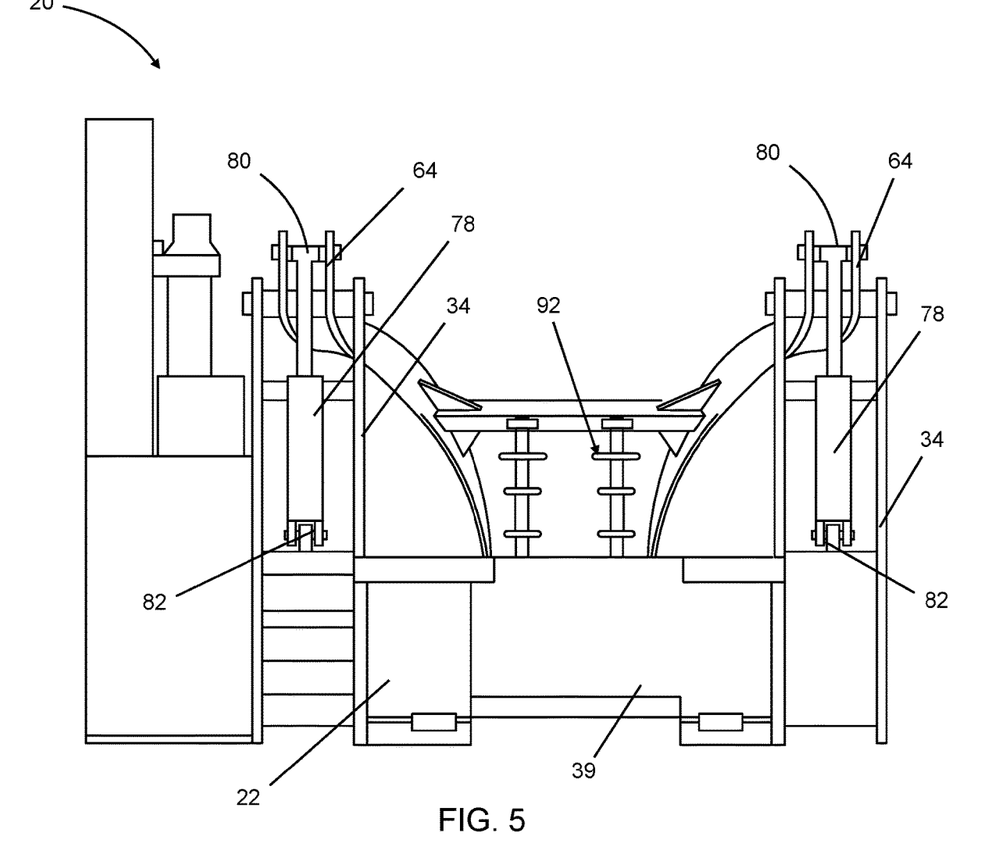
FIG. 5 is a rear elevational view of the attachment of FIG. 4.

It should be appreciated that a skilled artisan can employ any track system known in the art suitable for permitting the processing assembly 26 to be variably positionable, as desired. Furthermore, it should be appreciated that a skilled artisan can employ a frame 22 having any configuration known in the art that is suitable for supporting the material engagement assembly 24 and/or the processing assembly 26, as desired. For example, as shown in FIGS. 4-5, the frame 22 can include a solid structure 39 extending between the vertical support members 34.

The material engagement assembly 24 includes a planar engagement surface 40 and a curved engagement surface 42 (best shown in FIG. 3) configured to move relative to the planar engagement surface 40 to engage the material 28 therebetween. In one example, the material engagement assembly 24 can include a grab 44 having the planar engagement surface 40 and the curved engagement surface 42. The grab 44 can include various numbers of tines, hooks, jaws, bucket portions, and other articulating surfaces to engage the material 28.

In the example shown in FIGS. 1-2, the material engagement assembly 24 includes a pair of planar tines 46 having the planar engagement surface 40 and a top clamp 48 having the curved engagement surface 42. The pair of planar tines 46 can be parallel relative to each other and are coupled at opposing ends 36 of the frame 22 and each planar tine 46 includes a first planar portion 50 and a second planar portion 52 at a right angle relative to the first planar portion 50. In this way, the second planar portion 52 of each planar tine 46 can be coupled to the front side 30 of the frame 22 such that the first planar portion 50 extends from a bottom end 54 of the second planar portion 52 and away from the frame 22. The first planar portion 50 includes a bottom 56 that is configured to engage a ground surface or floor of a work site.

Figure 10:
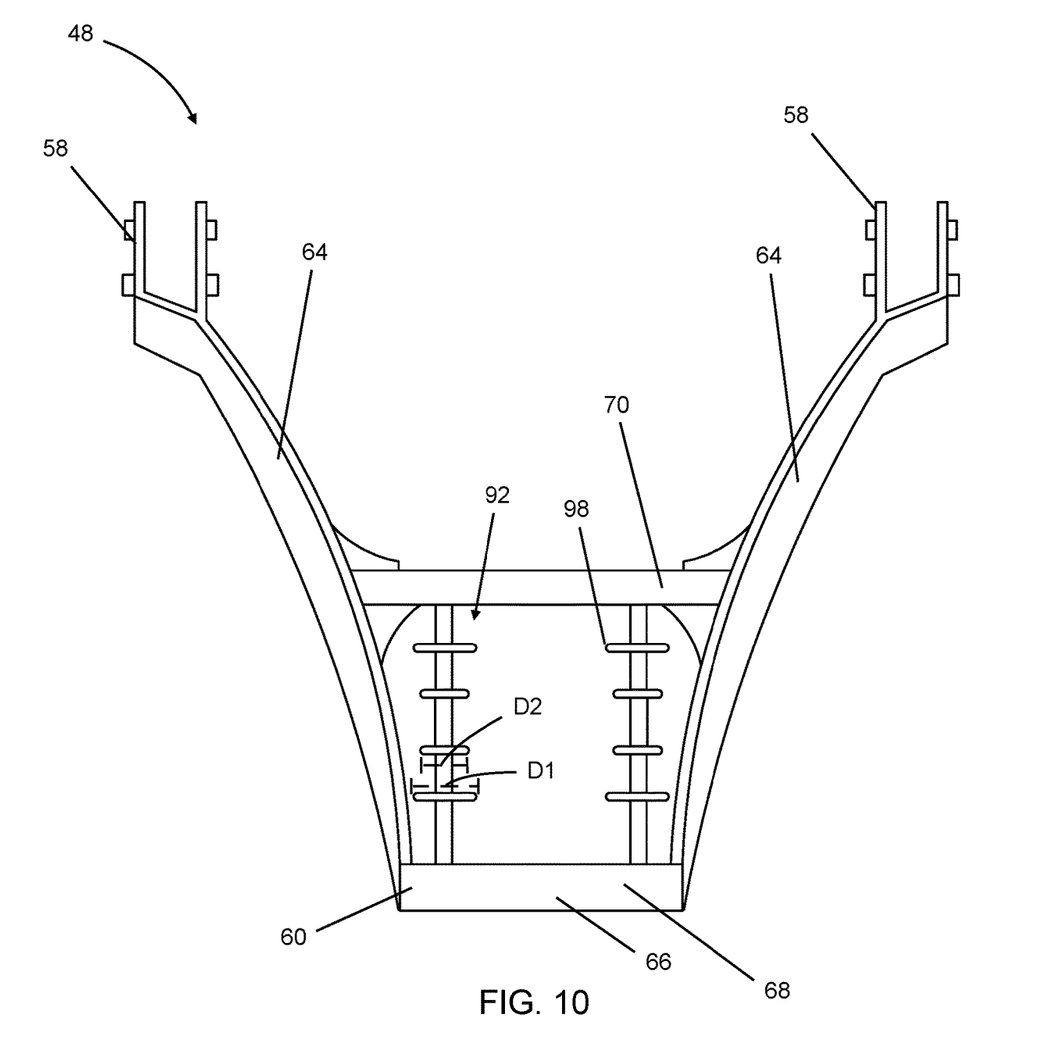
FIG. 10 is a front elevational view of a top clamp according to the present disclosure.
Figure 11:
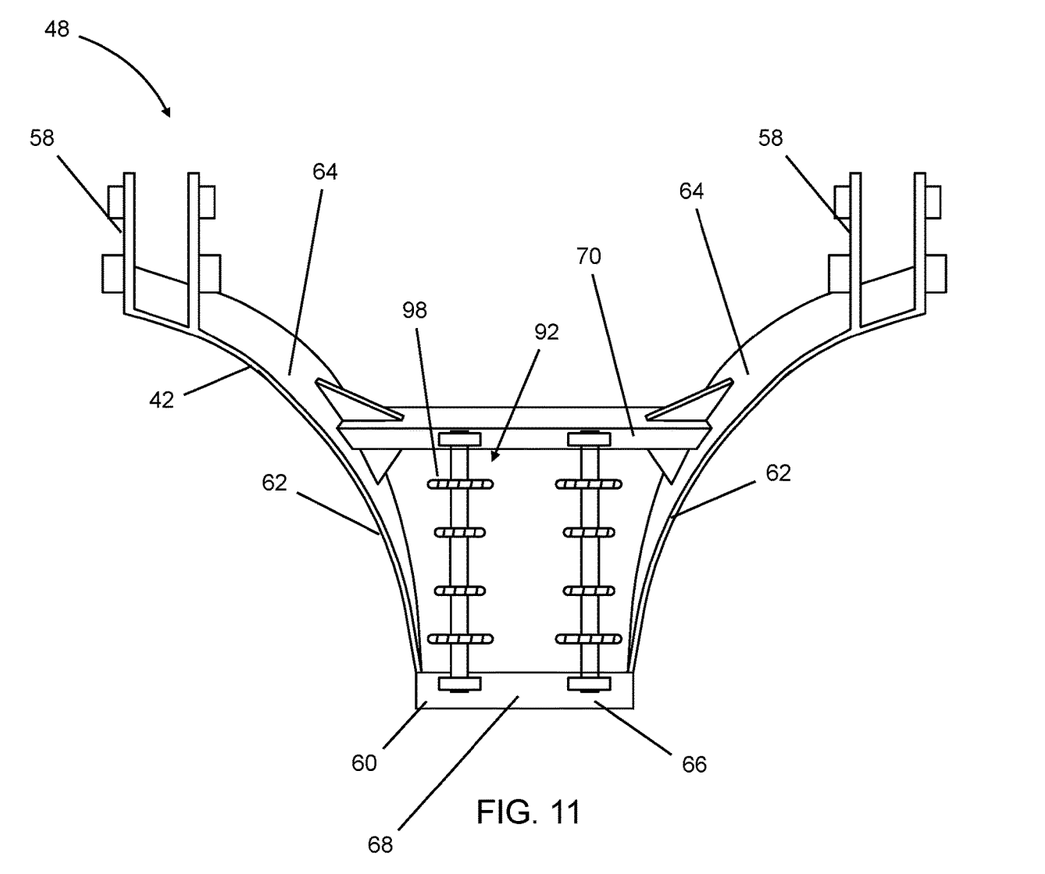
FIG. 11 is a rear elevational view of a top clamp according to the present disclosure.

With further reference to FIGS. 10-11, the top clamp 48 includes a proximal end 58, a distal end 60, and an inner concave edge 62 (FIG. 11) defining the curved engagement surface 42. The curved engagement surface 42 is configured to bear against and stabilize the material 28 while the material 28 is being cut, which is described in greater detail below.

In one example, the top clamp 48 can include a pair of curved tines 64 and a crossmember 66 therebetween. A distance between the pair of curved tines 64 can decrease towards the distal end 60 of the top clamp 48. The crossmember 66 can be disposed between the pair of curved tines 64 to provide additional structural stability for engagement with the material 28. In one example, the top clamp 48 includes a plurality of crossmembers 66 including a distal end crossmember 68 and a central crossmember 70. It should be appreciated that a skilled artisan can scale the number and location of the crossmember 66 depending on the size of the top clamp 48, as desired.

Figure 8:
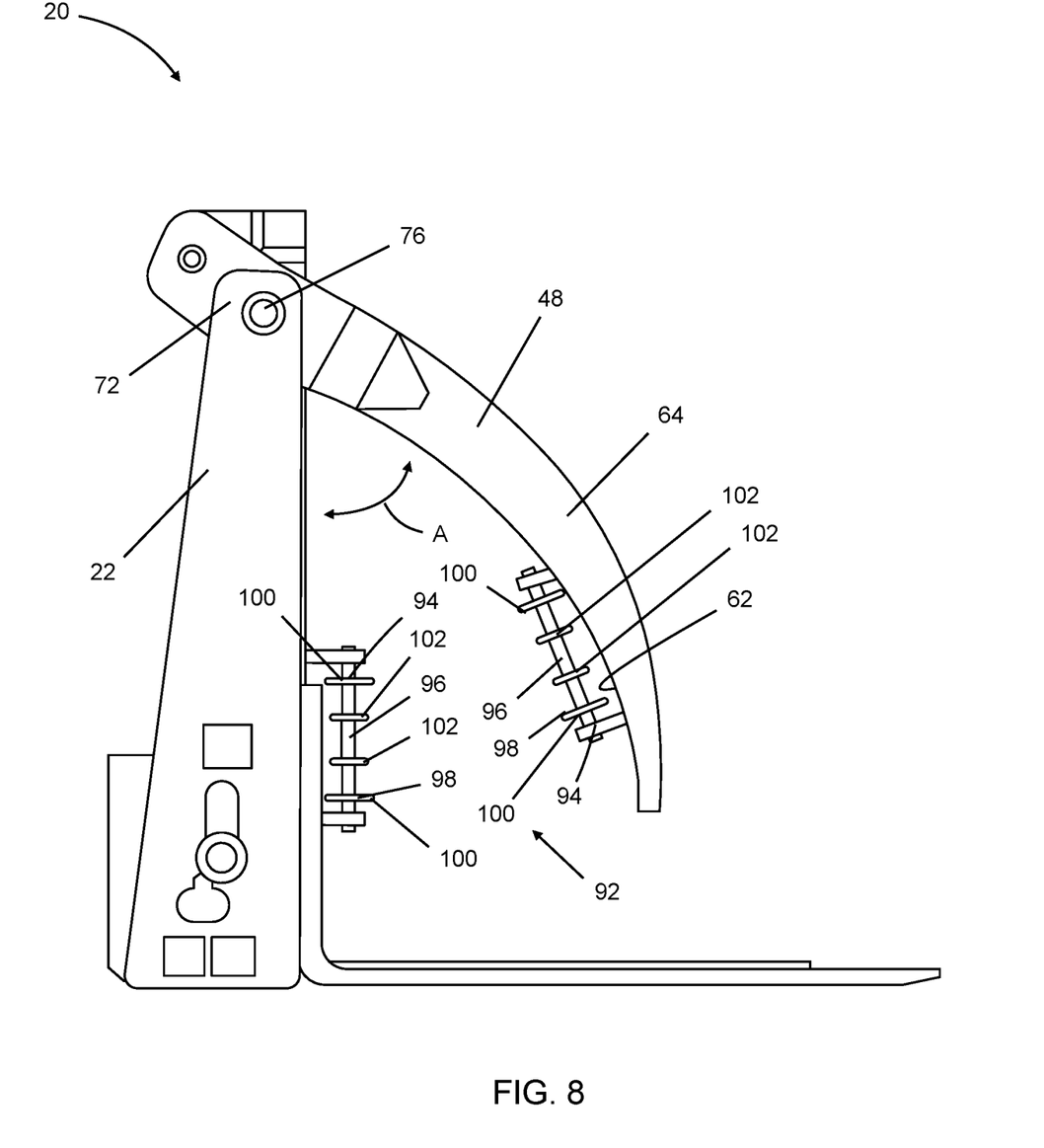
FIG. 8 is a left-side elevational view of the attachment of FIG. 4.

The top clamp 48 is configured to be pivotally coupled to a top portion 72 of the frame 22 via a hinged connection. More specifically, the proximal end 58 of each curved tine 64 is coupled to the top portion 72 of the frame 22 via a hinge assembly 76 that is adapted to facilitate pivotal movement of the top clamp 48 relative to the frame 22 about a substantially horizontal axis X of rotation for vertical-lift rotation, as shown by arrow A (FIG. 8). The vertical-lift rotation allows the top clamp 48 to pivot between an open position (FIG. 1) and a closed position (FIG. 2). The closed position includes a fully closed position and any intermediate position between the open position and fully closed position, which is described in greater detail below.

The material engagement assembly 24 can be powered in various ways to control the pivotal movement of the top clamp 48 so that the curved engagement surface 42 moves relative to the planar engagement surface 40. In one example, the attachment 20 includes hydraulically powering the material engagement assembly 24. In this non-limiting example, a hydraulic actuator 78 is provided that is adapted to control the pivotal movement of the top clamp 48 about the horizontal axis X of rotation, thereby controlling engagement of the material 28 between the curved engagement surface 42 and planar engagement surface 40. A hydraulic actuator 78 can be provided for each one of the curved tines 64, wherein each hydraulic actuator 78 includes a first end 80 connected to a respective curved tine 64 via a hinged connection and a second end 82 connected to the frame 22 via a hinged connection. In one example, the hydraulic actuator 78 can be disposed substantially parallel to its respective curved tine 64 (FIG. 1). Alternatively, the hydraulic actuator 78 can be disposed in the vertical support members 34 of the frame 22 (FIG. 5). It should be appreciated that a skilled artisan may employ other types of actuators for controlling pivotal movement of the top clamp 48, as desired. Non-limiting examples include pneumatic actuators and mechanical actuators, among others.

In operation, extension or retraction of the hydraulic actuator 78 causes the top clamp 48 to pivot between the open position and the closed position or intermediate position to permit engagement and disengagement of the material 28. In the open position, the top clamp 48 is vertically lifted in a direction away from the pair of planar tines 46 such that the top clamp 48 is disengaged with the material 28 thereby allowing the material 28 (e.g., a log) to be loaded onto or removed from the material engagement assembly 24, and more specifically, allowing the material 28 to be loaded onto or removed from a portion of the planar engagement surface 40 of the pair of planar tines 46. Where the material 28 is loaded onto the pair of planar tines 46, extension or retraction of the hydraulic actuator 78 causes the top clamp 48 to pivot about the horizontal axis X of rotation in a direction toward the pair of planar tines 46 until the curved engagement surface 42 of the top clamp 48 bears against the material 28 such that the material 28 is engaged with and retained between the curved engagement surface 42 and the planar engagement surface 40 (e.g., closed position). In the closed position, the position of the top clamp 48 is determined by the size and/or amount of material 28 being retained and can include the fully closed position and any intermediate position between the open position and fully closed position. For example, the top clamp 48 may be in the fully closed position when retaining a small log having a small diameter and in an intermediate position when retaining a larger log having a larger diameter. As such, when the top clamp 48 is in the fully closed position, the distance between the curved engagement surface 42 and planar engagement surface 40 is less than the distance between curved engagement surface 42 and planar engagement surface 40 when the top clamp 48 is in an intermediate position.

Referring FIGS. 1-4 and 6, the processing assembly 26 is configured to be variably positionable along a portion of the longitudinal axis L of the material 28 when the material 28 is engaged by the material engagement assembly 24. The processing assembly 26 can be slidably disposed proximate one of the opposing ends 36 of the frame 22 relative to the material engagement assembly 24. The processing assembly 26 can be laterally positioned relative to the material engagement assembly 24 such that the processing assembly 26 can be translated along the longitudinal axis L of the material 28 to a desired processing point. The processing assembly 26 can include a casing 84 slidably disposed proximate an end 36 of the frame and a saw 86 pivotally coupled to the casing 84.

Figure 6:
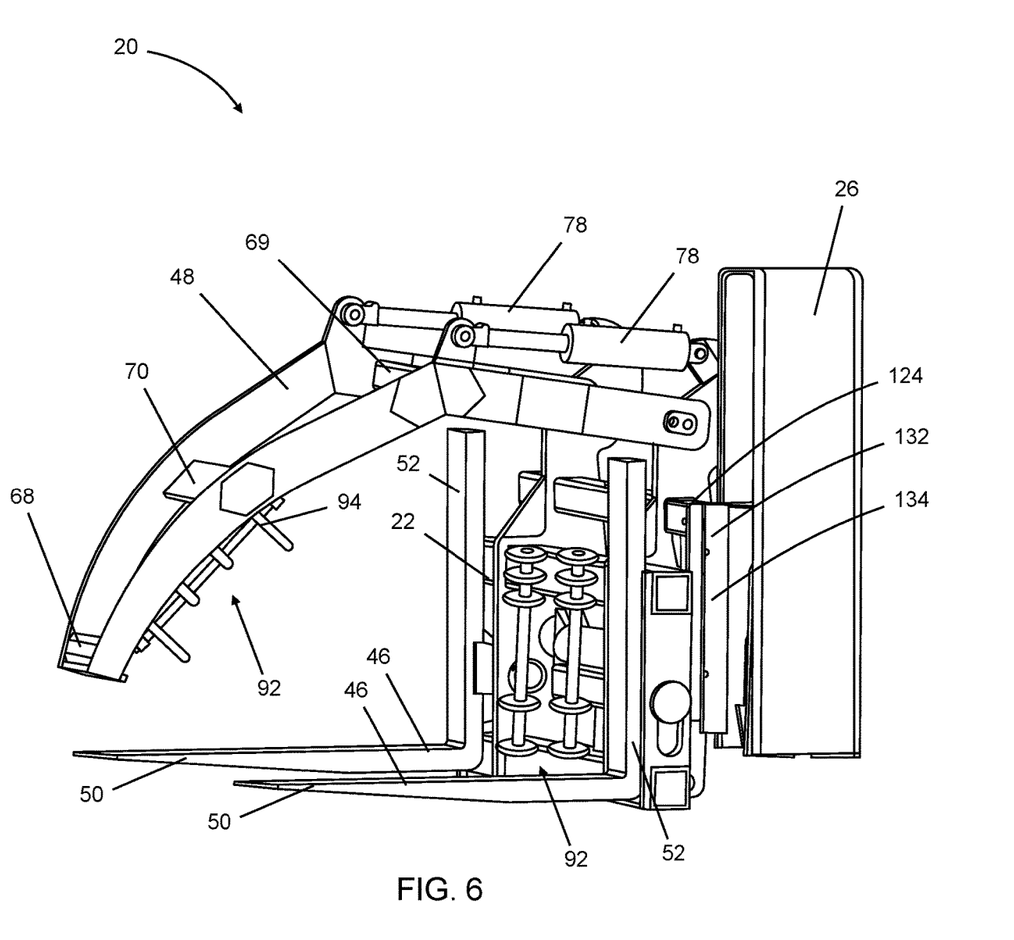
FIG. 6 is a perspective view of an attachment having a rolling assembly for handling and variable length processing of a wooden material according to the present disclosure.

In one example, as described above, the processing assembly 26 can be slidably coupled to the frame 22 via the attachment assembly 132. More specifically, the casing 84 of the attachment assembly 132 can be coupled to the upper inner beam 124 and the lower inner beam 128 of the track system 120 via the attachment assembly 132. As shown in FIG. 6, the attachment assembly 132 can include a mounting plate 134 affixed to the upper and lower inner beams 124, 128 and the casing 84. In this way, the telescoping feature of the track system 120 permits the attached processing assembly 26 to be variably positionable as the upper and lower inner beams 124, 128 extends from and/or retracts into the upper and lower outer beams 122, 126, respectively.

It should be appreciated that a skilled artisan can use any attachment means known in the art suitable for attaching the casing 84 to the upper and lower inner beams 124, 128, as desired. Non-limiting examples include welding, fastening, and soldering, among others.

The saw 86 is configured to be movable between a retracted position (FIG. 4) and an extended position (FIG. 9) to cut the material 28 orthogonal to the longitudinal axis L thereof when the material 28 is engaged by the material engagement assembly 24. Examples of the saw include a chain saw, a circular saw, and a reciprocating saw. The saw 86 can be powered in various ways and in one example, the saw 86 is driven by a hydraulic motor 88. A hydraulic cylinder 90 can be provided to facilitate and control the pivotal movement of the saw 86 about a substantially horizontal pivot axis X2 of rotation (FIGS. 2 and 4), thereby controlling the retraction and extension of the saw 86.

In operation, when the material 28 is engaged and retained by the material engagement assembly 24, the casing 84 of the processing assembly 26 can slide along the longitudinal axis L of the material 28 via the track system 120 thereby permitting side shift adjustment of the position of the casing 84 and therefore the saw 86 to a desired mark. Advantageously, in this way, the material 28 can be processed without adjusting the position of the material 28 within the material engagement assembly 24.

Figure 7:
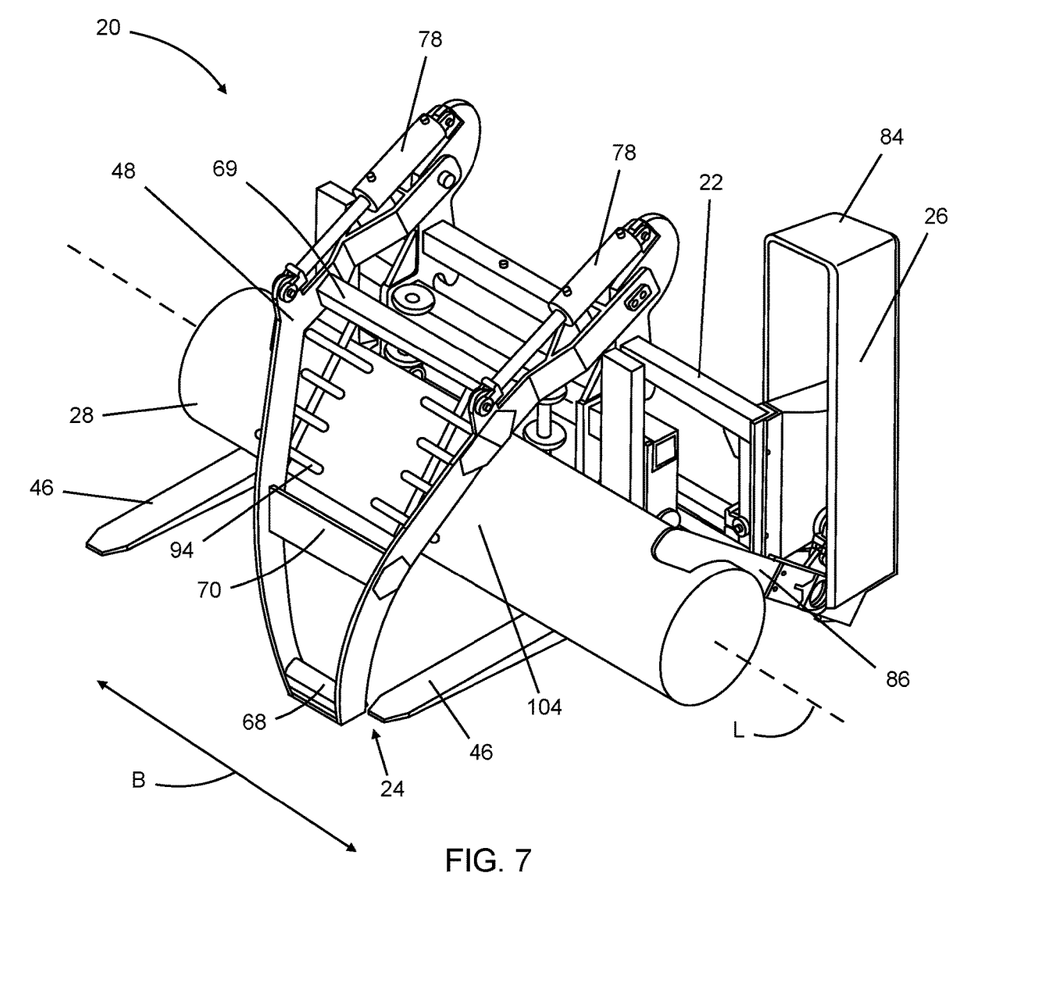
FIG. 7 is a perspective view of the attachment of FIG. 4, depicting the attachment engaging a log.

Referring to FIGS. 4-11, the attachment 20 can include a roller system 92 configured to drive the material 28 through the material engagement assembly 24 along a substantially linear travel path, as shown by arrow B (FIG. 7). The linear travel path can correspond to the longitudinal axis L of the material 28. The roller system 92 can be configured to permit the material 28 to travel along the linear travel path in a first direction toward the processing assembly 26 and a second direction away from the processing assembly 26.

Figure 9:
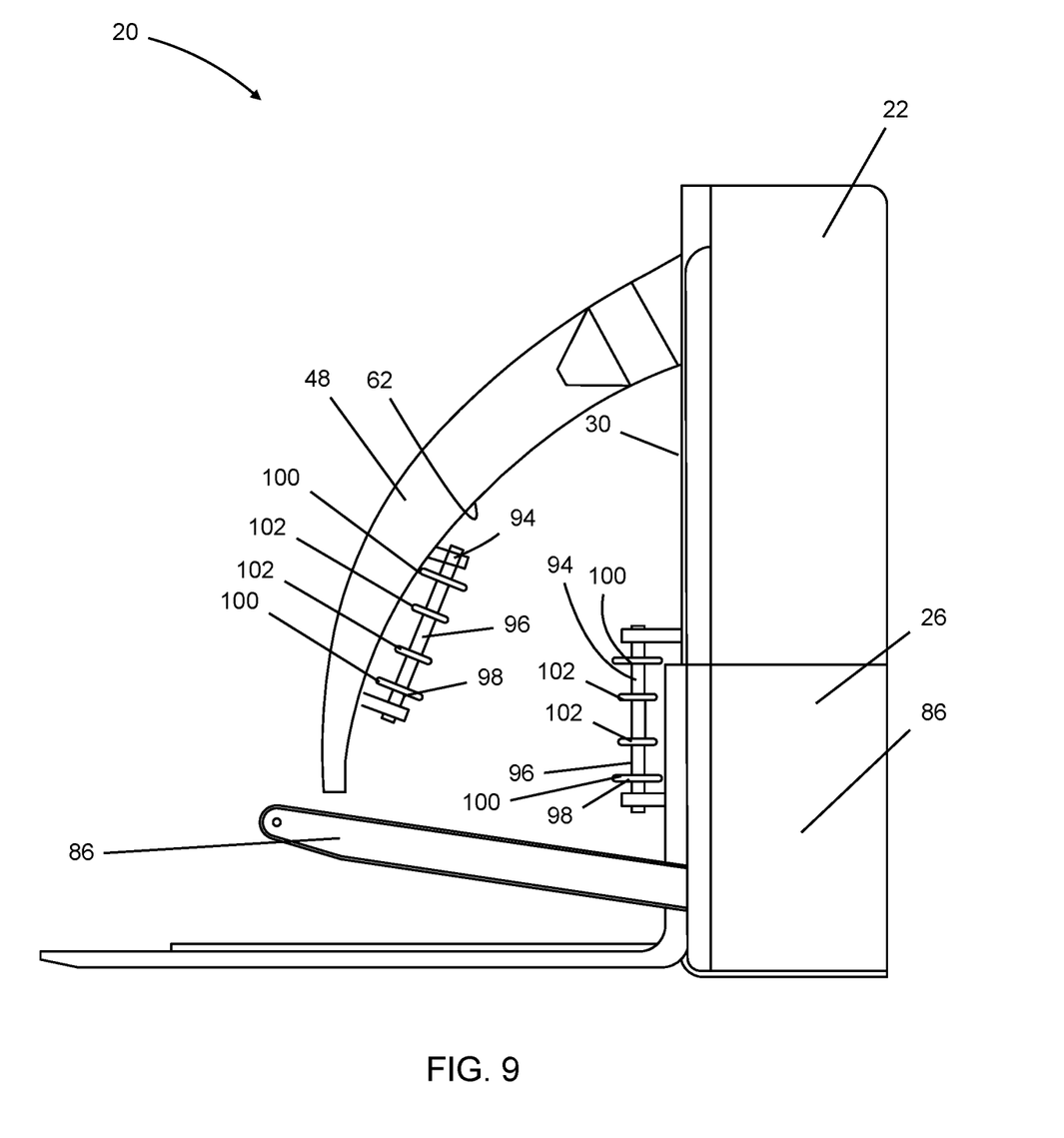
FIG. 9 is a right-side elevational view of the attachment of FIG. 4.

As best shown in FIGS. 8-9, in one example, the roller system 92 can be configured to be rotationally coupled to the frame 22 and the top clamp 48 of the material engagement assembly 24 to drive the material 28 through the material engagement assembly 24.

The roller system 92 can include a plurality of roller devices 94, each roller device 94 having a shaft 96 mounted to a rotatable arm and a row of guide rollers 98 mounted on the shaft 96. The row of guide rollers 98 can include outer guide rollers 100 and inner guide rollers 102 disposed between the outer guide rollers 100. In one example shown in FIG. 10, the outer guide rollers 100 define a diameter D1 that is larger than a diameter D2 of the of the inner guide rollers 102 such that the row of guide rollers 98 forms a concave or crescent shape corresponding to a curved outer surface 104 of the material 28. In a further example, the outer guide rollers 100 can be the same size and the inner guide rollers 102 can be the same size. It should be appreciated that a skilled artisan can scale the size and location of the guide rollers, as desired, to conform to a shape of the material 28.

In operation, actuation of the roller system 92 causes the plurality of roller devices 94 to rotate via the rotatable arm. In one example, the roller system 92 is hydraulically powered and includes a hydraulic motor adapted to control rotational movement of the plurality of roller devices 94 to drive the material 28 along the linear travel path in the first direction and the second direction. It should be appreciated that a skilled artisan may employ other suitable means known in the art to power the roller system 92, as desired.

Each guide roller 98 in the row of guide rollers 98 can be serrated (FIG. 11) for increased grip of the material 28 and to facilitate driving the material through the material engagement assembly 24. It should be appreciated that a skilled artisan may scale the size and shape of the guide rollers 98, as desired, to conform to the material 28 being cut.

As shown in FIGS. 6-8, in one example, the attachment 20 can include roller devices 94 disposed on the frame 22 and roller devices 94 disposed on the top clamp 48. More specifically, two roller devices 94 are disposed along the front side 30 of the frame 22 between the second planar portion 52 of the pair of planar tines 46 and two roller devices 94 are disposed along the inner concave edge 62 of the top clamp 48. In this way, the plurality of roller devices 94 are mounted to the frame 22 and top clamp 48 such that the linear travel path, as shown by arrow B (FIG. 7), in which the material 28 travels is defined by the row of guide rollers 98 of each roller device 94. Furthermore, the concave or crescent shape of each guide roller 98 formed by the varying diameters between outer guide rollers 100 and inner guide rollers 102 collectively creates a shape of the linear travel path that corresponds to a shape of the material 28.

It should be appreciated that a skilled artisan can scale the location of the roller devices 94, as desired. For example, as shown in FIG. 6, the top clamp 48 includes a pair of roller devices 94 attached to and extending from the distal end crossmember 68 to the central crossmember 70 such that one end of each roller device 94 is disposed near the distal end 60 of the top clamp 48. In a further example, as shown in FIG. 7, the top clamp 48 includes a pair of roller devices 94 attached to and extending from a proximal end crossmember 69 to the central crossmember 70 such that one end of each roller device 94 is disposed near the proximal end 58 of the top clamp 48.

In operation, extension or retraction of the hydraulic actuator 78 causes the top clamp 48 to pivot about the horizontal axis X in a direction away from the pair of planar tines 46 until the top clamp 48 reaches the open position thereby permitting the material 28 to be loaded. Once loaded, extension or retraction of the hydraulic actuator 78 causes the top clamp 48 to pivot about the horizontal axis X in a direction toward the pair of planar tines 46 until the roller devices 94 disposed on the top clamp 48 bears against the material 28 such that the material is engaged with and secured between the roller devices 94 of the top clamp 48 and pair of planar tines 46 (e.g., the closed position). In the closed position, the plurality of roller devices 94 engage with and surround the material 28 thereby creating the linear travel path. The material 28 can be moved in a selected direction via the hydraulic motor. For example, the hydraulic motor can drive the material 28 in the first direction toward the processing assembly 26 to permit crosscutting of the material 28 via the saw 86. Alternatively, the hydraulic motor can drive the material 28 in the second direction away from the processing assembly 26.

Advantageously, the roller system 92 drives the material 28 through the material engagement assembly 24 without requiring a user to disengage the material after every cut and thus allows crosscutting the material 28 more efficiently. Furthermore, no portion of the attachment 20 provided herein restricts the length of the material 28 along the longitudinal axis L thereof when the material 28 is engaged by the material engagement assembly 24. As such, the material engagement assembly 24 can engage the material 28 at various points along the longitudinal axis L thereof without any structure of the attachment 20 interfering with any length of the material 28 or restricting a length of the material 28.

Referring back to FIG. 4, the attachment 20 can further include a guide system 106 configured to ascertain a processing location when the processing assembly 26 is positioned along a portion of the longitudinal axis L of the material 28, when the material 28 is engaged by the material engagement assembly 24. The guide system 106 can include a camera 108 configured to transmit an image of the processing location. For example, the camera 108 can transmit the image to a display in the powered vehicle to which the attachment 20 is coupled. In this way, the vehicle operator can view the image to better ascertain a desired processing point of the material 28. The material 28 (e.g., log, rough timber, lumber, board, plank, etc.) can be premarked for processing, where the operator can identify one or more markings using the guide system 106. Alternatively, the operator can use the guide system 106 to measure and/or locate a desired processing location based upon processing criteria. The guide system 106 can be disposed on the processing assembly 26. The guide system 106 can include projecting a processing location (e.g., cutting location) onto the material using a light (e.g., laser) or the guide system 106 can provide a phantom or virtual image of a processing location in the image provided on the display. Certain embodiments include where the processing assembly 26 includes a saw 86 and a casing 84, where the saw 86 is configured to cut the material 28 orthogonal to the longitudinal axis thereof when the material 28 is engaged by the material engagement assembly 24, the saw 86 at least partially covered by the casing 84 when not in use, and where the guide system 106 can be coupled to the casing 84.

The guide system 106 can further include a measuring device disposed on the roller system 92 to measure data (e.g., length) and/or locate the desired processing location based upon processing criteria.

As shown in FIG. 2, the attachment 20 of the present disclosure can be provided on a powered vehicle 110. For example, the attachment 20 can be adapted for coupling to various wheeled and/or tracked vehicles or carriers, including articulating loaders, skid steer loaders, forklifts, tractors, etc. In this way, preexisting equipment can be outfitted with the attachment, as well as other attachments (e.g., buckets, grapples, blades, etc.). It is also possible to have a powered vehicle 110 dedicated for use with the attachment 20 for handling and variable length processing of a material 28 having a longitudinal axis L. The attachment 20 can be reversibly coupled to the powered vehicle 110, allowing removal for replacement or maintenance thereof, or exchange with a differently configured attachment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

While certain representative embodiments and details have been shown for purposes of illustrating the present disclosure, it will be apparent to those skilled in the art that various changes may be made without departing from the scope of the disclosure, which is further described in the following appended claims.

What is claimed is:

1. An attachment for handling and variable length processing of a material, the material having a longitudinal axis, the attachment comprising:
   a frame including a track system, the track system having an upper outer beam, an upper inner beam, a lower outer beam, and a lower inner beam, and the upper inner beam slidingly engaged with the upper outer beam, the upper inner beam configured to telescope within the upper outer beam, the lower inner beam slidingly engaged with the lower outer beam, the lower inner beam configured to telescope within the lower outer beam;
   a material engagement assembly configured for engaging the material about the longitudinal axis, the material engagement assembly being supported by the frame, the material engagement assembly including planar tines, a curved engagement surface and a top clamp, the planar tines defining a planar engagement surface, the curved engagement surface configured to move relative to the planar engagement surface and engage the material therebetween, the top clamp including a pair of curved tines, a distal cross member disposed at a free end of the top clamp between and connecting the pair of curved tines, and a central cross member disposed at an intermediate location of the top clamp between and connecting the pair of curved times, the distal cross member having a first length, and the central cross member having a second length, and the first length is less than the second length, each of the curved tines of the pair of curved tines curving downwardly and having a proximal end coupled to the frame via a hinge assembly;

an actuator including a first end coupled to the frame and a second end coupled to the top clamp of the material engagement assembly, the actuator configured to pivotally move the top clamp between an open position and a closed position;

a processing assembly coupled to the track system of the frame and variably positionable by the track system along a portion of the longitudinal axis of the material to a processing location when the material is engaged by the material engagement assembly, the processing assembly including a saw and a casing, the casing having an upper portion and a lower portion, the saw mounted at the lower portion of the casing and oriented on a plane, the upper portion having a recess that is laterally offset from the plane;

a hydraulic cylinder mounted on the frame and adapted to control a telescoping movement of the upper inner beam and lower inner beam of the track system, thereby controlling a position of the processing assembly relative to the frame; and a guide system disposed on the processing assembly and configured to ascertain the processing location when the material is engaged by the material engagement assembly, the guide system including a camera mounted inside of and within the recess at the upper portion of the casing of the processing assembly, the camera configured to transmit an image of the processing location to a display in a powered vehicle to which the attachment is configured to be coupled, wherein the hinge assembly facilitates pivotal movement of the top clamp relative to the frame between the open position and the closed position, wherein the top clamp in the open position is vertically lifted in a direction away from the planar tines such that the top clamp is disengaged from the material and a position of the top clamp in the closed position is determined by a size and an amount of the material, wherein each of the curved tines tapers inwardly toward another of the curved tines, and a distance between the curved tines at the proximal end is greater than a distance between the curved tines at the free end, and wherein the planar engagement surface includes a first planar portion and a second planar portion, the second planar portion oriented at an angle relative to the first planar portion.

2. The attachment of claim 1, wherein no portion of the attachment is operable to restrict a length of the material along the longitudinal axis when engaged by the material engagement assembly.

3. The attachment of claim 1, wherein the planar tines and the curved tines form a grab.

4. The attachment of claim 1, wherein the saw is configured to cut the material orthogonal to the longitudinal axis when the material is engaged by the material engagement assembly.

5. A combination comprising: the powered vehicle, and the attachment according to claim 1 coupled to the powered vehicle.

* * * * *